US011865441B2

(12) United States Patent
Wu et al.

(10) Patent No.: US 11,865,441 B2
(45) Date of Patent: Jan. 9, 2024

(54) INTELLIGENT WI-FI HIGH PERFORMANCE SUPPORT FOR GAMING MODE

(71) Applicant: MEDIATEK INC., Hsin-Chu (TW)

(72) Inventors: Pao-Chen Wu, Hsinchu (TW);
Yu-Yang Lin, Hsinchu (TW);
Shiuan-Wen Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 91 days.

(21) Appl. No.: 17/543,759

(22) Filed: Dec. 7, 2021

(65) Prior Publication Data

US 2022/0176242 A1    Jun. 9, 2022

Related U.S. Application Data

(60) Provisional application No. 63/122,519, filed on Dec. 8, 2020.

(51) Int. Cl.
*A63F 13/327* (2014.01)

(52) U.S. Cl.
CPC ...... *A63F 13/327* (2014.09); *A63F 2300/405* (2013.01)

(58) Field of Classification Search
None
See application file for complete search history.

(56) References Cited

U.S. PATENT DOCUMENTS

| 7,873,377 B1* | 1/2011 | Cocos | H04W 48/16 |
| | | | 370/312 |
| 9,001,769 B1* | 4/2015 | Park | H04W 72/563 |
| | | | 370/329 |
| 2017/0325103 A1* | 11/2017 | Casebolt | A63F 13/327 |
| 2019/0069274 A1* | 2/2019 | Wei | H04W 72/04 |

FOREIGN PATENT DOCUMENTS

| CN | 101822094 B | 6/2014 |
| CN | 109731336 A | 5/2019 |
| TW | 202008848 A | 2/2020 |
| TW | 202131717 A | 8/2021 |
| WO | 2020/094034 A1 | 5/2020 |

\* cited by examiner

*Primary Examiner* — Damon J Pierce
(74) *Attorney, Agent, or Firm* — Winston Hsu

(57) ABSTRACT

The present invention provides a computer-implemented method performed in an electronic device, wherein the computer-implemented method comprises the steps of: determining if an operating system of the electronic device enables a gaming mode; and if it is determined that the operating system of the electronic device enables the gaming mode, controlling a wireless communication module of the electronic device to not perform at least one operation that will decrease throughput of the wireless communication module; and if it is determined that the operating system of the electronic device does not enable the gaming mode, at least one operation that will decrease throughput of the wireless communication module is allowed to be executed by the wireless communication module.

12 Claims, 4 Drawing Sheets

INTELLIGENT WI-FI HIGH PERFORMANCE SUPPORT FOR GAMING MODE

CROSS REFERENCE TO RELATED APPLICATIONS

This application claims the priority of U.S. Provisional Application No. 63/122,519 (filed on 2020 Dec. 8), which is included herein by reference in its entirety.

BACKGROUND

Online games usually need to send and receive a large number of packets in real time, so that the user's electronic device can quickly send commands to a remote server, and can also receive information from the remote server on time. However, a Wi-Fi module within the electronic device may operate in a power saving mode due to certain settings to reduce throughput, or the electronic device may perform certain background operations that affect the throughput of game packets, thus influencing the smoothness of the game.

SUMMARY

It is therefore an objective of the present invention to provide a computer-implemented method, which can stop or suspend the operations that will influence the smoothness of the game if it is determined that the user is playing game, so solve the above-mentioned problems.

According to one embodiment of the present invention, a computer-implemented method performed in an electronic device comprises the steps of: determining if an operating system of the electronic device enables a gaming mode; and if it is determined that the operating system of the electronic device enables the gaming mode, controlling a wireless communication module of the electronic device to not perform at least one operation that will decrease throughput of the wireless communication module; and if it is determined that the operating system of the electronic device does not enable the gaming mode, at least one operation that will decrease throughput of the wireless communication module is allowed to be executed by the wireless communication module.

According to another embodiment of the present invention, a computer program product having a plurality of files is disclosed, wherein the plurality of files are executed by a computer to cause the computer to perform the steps of: determining if an operating system of the electronic device enables a gaming mode; and if it is determined that the operating system of the electronic device enables the gaming mode, controlling a wireless communication module of the electronic device to not perform at least one operation that will decrease throughput of the wireless communication module; and if it is determined that the operating system of the electronic device does not enable the gaming mode, at least one operation that will decrease throughput of the wireless communication module is allowed to be executed by the wireless communication module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
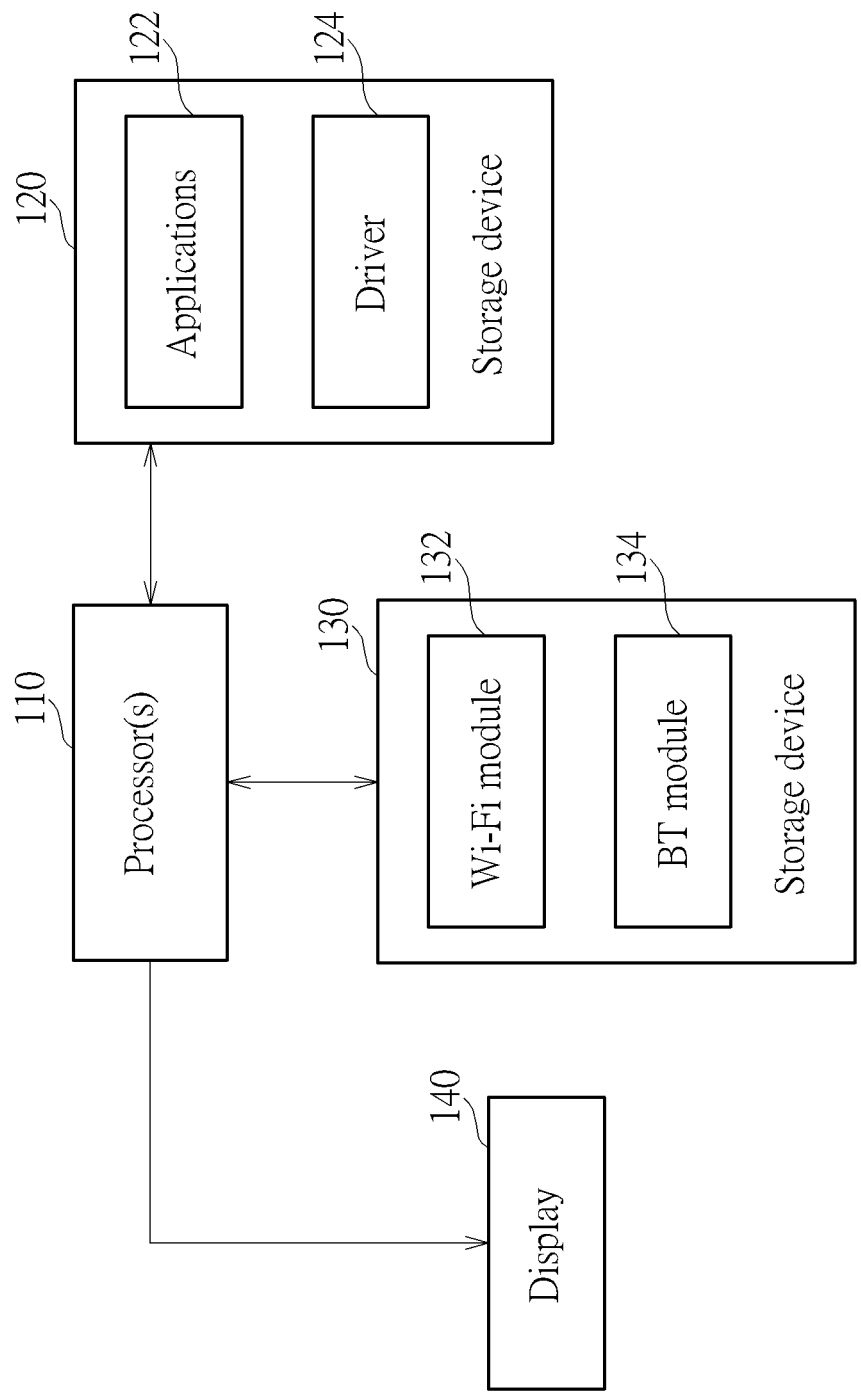
FIG. 1 is a diagram illustrating an electronic device according to one embodiment of the present invention.

FIG. 1 is a diagram illustrating an electronic device 100 according to one embodiment of the present invention. As shown in FIG. 1, the electronic device 100 comprises at least one processor 110, a storage device 120, a wireless communication device 130 and a display 140. The at least one processor 110 may comprise a central processing unit (CPU) or an application processor. The storage device 120 is configured to store an operating system (OS), applications 122 and a driver 124, wherein the applications 122 may comprise a real-time video game, the driver 124 may comprise a Wi-Fi driver and/or Bluetooth (BT) driver, and the driver 124 is configured to be loaded by the processor 120 to control the operations of the wireless communication device 130. The wireless communication device 130 may comprises a Wi-Fi module 132 and a BT module 134, wherein the Wi-Fi module 132 is configured to receive and transmit packets based on IEEE 802.11 specifications, and the BT module 134 is configured to receive and transmit packets based on BT specifications. The display 140 is configured to display the images or video data from the processor 110, wherein in other embodiments, the display 140 may be positioned outside the electronic device 100, that is the display 140 may connect to the electronic device via a cable such as a High Definition Multimedia Interface (HDMI) cable. In this embodiment, the electronic device 100 may be a notebook, a personal computer, a tablet, a portable device or any other electronic device capable of playing games.

In the operations of the processor 110 and the wireless communication device 130, the processor 110 may periodically control the Wi-Fi module 132 of the wireless communication device 130 to perform a background scan operation to scan other channels to generate a scan result, wherein the scan result may be used to determine if another access point (AP) is capable of establishing a link, or to determine the signal quality of the other channels. In, addition, the Wi-Fi module 132 may enter a low-power state (e.g., L1 sub-state) to reduce the throughput to lower the power consumption. However, these operations may influence the smoothness of the real-time game that needs to continuously transmit and receive a large number of packets. In order to solve this problem, the driver 124 is configured to detect if the electronic device 100 is operating in the gaming mode, and if it is determined that the electronic device 100 operates in the gaming mode, the processor 110 executing the driver 124 can control the Wi-Fi module 132 not enter the low-power state, and/or the processor 110 does not control the Wi-Fi module 132 to perform the background scan. That is, the operations that may affect the throughput will be stopped or suspended until the electronic device 100 does not operate in the gaming mode. In another embodiment, if the BT module 134 is used for transmitting and receiving packets of the game, the processor 110 can also control the BT module 134 to not enter the low-power state.

Figure 2:
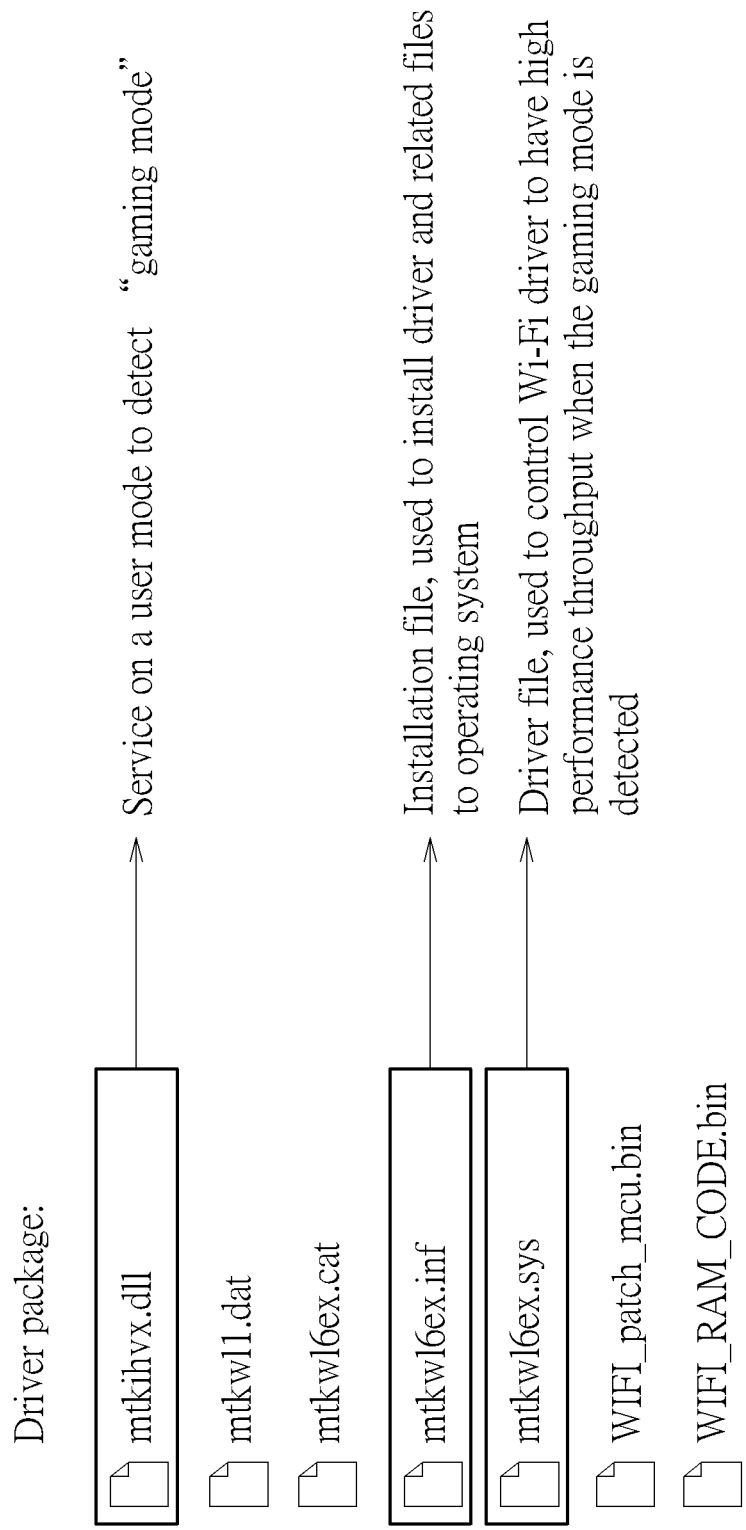
FIG. 2 shows a driver package of the driver according to one embodiment of the present invention

FIG. 2 shows a driver package of the driver 124 according to one embodiment of the present invention, wherein the driver package may be preloaded into the storage device 120, or the driver package may be a computer program product that is allowed to be downloaded from a remote server via Internet. As shown in FIG. 2, the driver package may comprise several files such as mtkihvx.dll, mtkwl1.dat, mtkwl6ex.cat, mtkwl6ex.inf, mtkwl6ex.sys, WIFI_patch_mcu.bin, WIFI_RAM_CODE.bin. The file "mtkwl6ex.inf" is an installation file, which is used to install all the related files (i.e., *.sys, *.dll, *.dat, *.bin) to the operating system. The file "mtkihvx.dll" is a service running on a user mode to detect if the electronic device 100 has the gaming mode. The file "mtkwl6ex.sys" is a driver file used to control the wireless communication device 130 to have high performance throughput when the gaming mode is detected.

Figure 3:
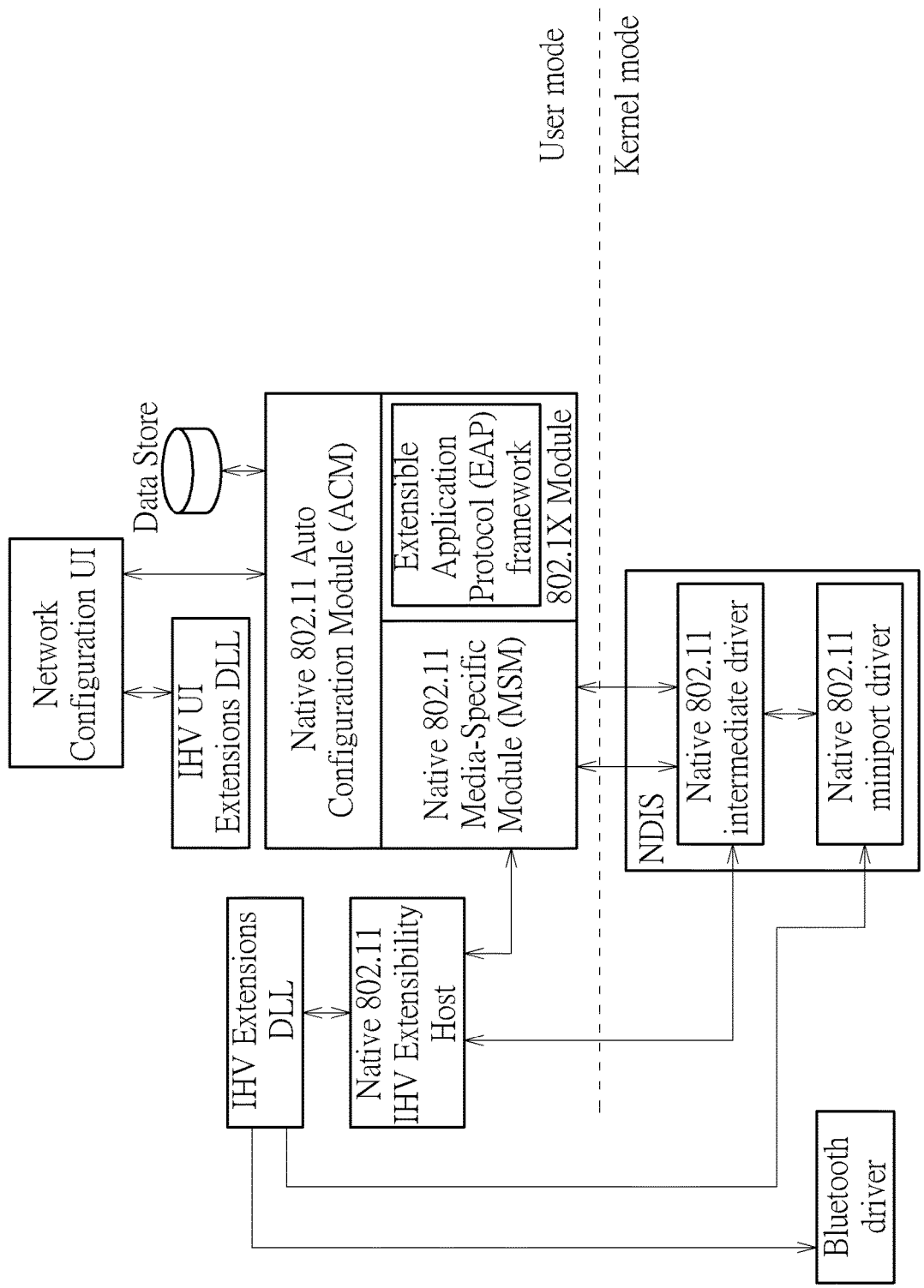
FIG. 3 is a diagram illustrative a software architecture with the driver according to one embodiment of the present invention.

FIG. 3 is a diagram illustrative a software architecture with the driver 124 according to one embodiment of the present invention. In this embodiment, the operating system of the electronic device is Microsoft Windows 10, and the software architecture shown in FIG. 3 is Native 802.11 software architecture. The software architecture comprises a user mode and a kernel mode, and the processor 110 can switch between the two modes depending on what type of code is running on the processor 110, wherein the applications 122 run in the user mode, and core operating system components run in the kernel mode. When the processor 110 operates in the user mode, the processor 110 has limited access, and the processor cannot direct access the hardware; and when the processor 110 runs in the kernel mode, the processor 110 can receive the request to access the hardware components. In FIG. 3, in the user mode, the architecture has several modules such as network configuration user interface (UI), an independent hardware vendor (IHV) UI extensions DLL, a native 802.11 auto configuration module (ACM), a native 802.11 media-specific module (MSM), an extensible authentication protocol (EAP) framework within 802.1X module, a native 802.11 IHV extensibility host and IHV extensions DLL. In the kernel mode, the architecture has several modules such as a native 802.11 intermediate driver and native 802.11 miniport driver satisfying network driver interface specification (NDIS), and a Bluetooth driver. It is noted that most modules of the software architecture shown in FIG. 3 are known by a person skilled in the art, and the present embodiment focuses on the functions of the file "mtkihvx.dll" corresponding to IHV extensions DLL and the file "mtkwl6ex.sys" corresponding to the native 802.11 miniport driver, so the detailed descriptions about the other modules are omitted here.

The Microsoft Windows 10 can enable the gaming mode to increase the performance. In this embodiment, the file "mtkihvx.dll" is executed to register notification function to automatically detect the gaming mode by Microsoft Application Program Interface (API), that is, if the user plays game, the call back function of the operating system will notify that the user is playing game. After receiving the notification of the gaming mode, the execution of the file "mtkihvx.dll" notifies the Wi-Fi driver of the driver 124 that the gaming mode is enabled. Then, once the Wi-Fi driver is notified that the gaming mode is enabled, the Wi-Fi driver stops or suspends the operations that may influence the smoothness of the real-time game that needs to continuously transmit and receive a large number of packets. For example, the Wi-Fi driver can stop or suspend the background scan issued by the operating system, that is the Wi-Fi driver will not control the Wi-Fi module 132 to switch or temporarily switch to other channels to determine if any other AP is capable of establishing a link, or to determine the signal quality of the other channels. In another example, the Wi-Fi driver will notify the firmware of the Wi-Fi module 132 to not enter the low-power state (e.g., L1 sub-state), so that the Wi-Fi module 132 will not enter the low-power state and can give higher throughput for the large number of packets.

In addition, if the Wi-Fi driver is not notified that the gaming mode is enabled, the background scan issued by the operating system is allowed, that is the Wi-Fi driver will control the Wi-Fi module 132 to switch or temporarily switch to other channels to determine if any other AP is capable of establishing a link, or to determine the signal quality of the other channels, if the Wi-Fi driver receives the background scan notification from the operating system; and/or the Wi-Fi driver can notify the firmware of the Wi-Fi module 132 to enter the low-power state in an appropriate time.

In another embodiment, if the BT module 134 is used for transmitting and receiving packets of the game, the execution of the file "mtkihvx.dll" notifies the BT driver of the driver 124 that the gaming mode is enabled. Then, once the BT driver is notified that the gaming mode is enabled, the BT driver stops or suspends the operations that may influence the smoothness of the real-time game that needs to continuously transmit and receive a large number of packets. For example, the BT driver will notify the firmware of the BT module 134 to not enter the low-power state, so that the BT module 134 will not enter the low-power state and can give higher throughput for the large number of packets.

Figure 4:
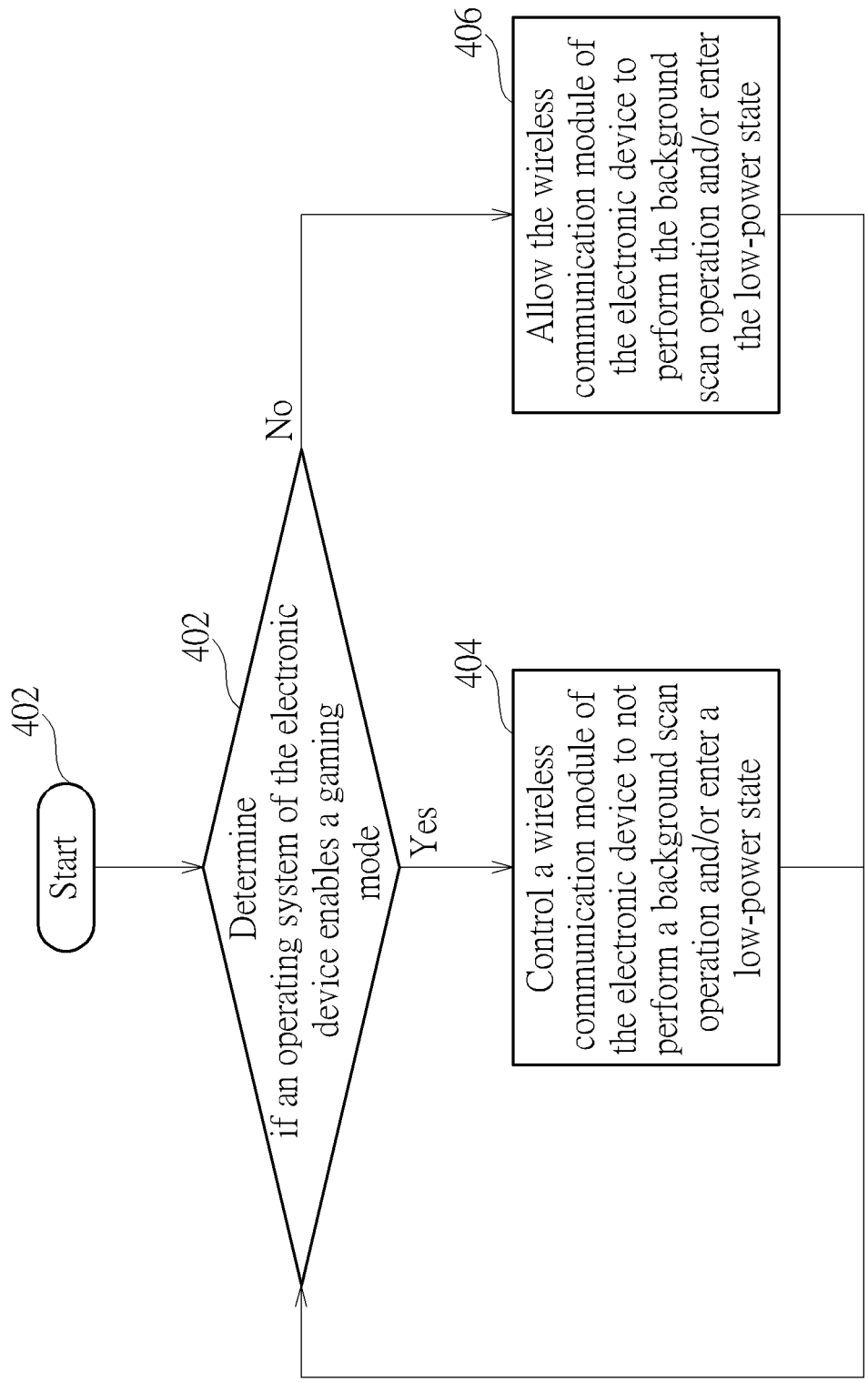
FIG. 4 is a computer-implemented method performed in an electronic device according to one embodiment of the present invention.

FIG. 4 is a computer-implemented method performed in an electronic device according to one embodiment of the present invention. Referring to the above embodiments, the flow of the computer-implemented method is described as follows.

Step 400: the flow starts.

Step 402: determine if an operating system of the electronic device enables a gaming mode, and if it is determined that the operating system of the electronic device enables the gaming mode, the flow enters Step 404; and if it is determined that the operating system of the electronic device does not enable the gaming mode, the flow enters Step 406.

Step 404: control a wireless communication module of the electronic device to not perform a background scan operation and/or enter a low-power state.

Step 406: Allow the wireless communication module of the electronic device to perform the background scan operation and/or enter the low-power state.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer-implemented method performed in an electronic device, comprising:
    determining if an operating system of the electronic device enables a gaming mode; and
    if the operating system is determined to enable the gaming mode, notifying a driver operating in a kernel mode that the gaming mode is enabled, and controlling a wireless communication module of the electronic device to not perform at least one operation that will decrease throughput; and
    if the operating system is determined not enable the gaming mode, the at least one operation that will decrease throughput is allowed to be executed by the wireless communication module;
    wherein the electronic device switches between a user mode and the kernel mode in which the user mode is used for applications and the kernel mode is used for core operating system components.

2. The computer-implemented method of claim 1, wherein the step of controlling the wireless communication module of the electronic device to not perform the at least one operation that will decrease throughput comprises:
    if it is determined that the operating system of the electronic device enables the gaming mode, controlling the wireless communication module of the electronic device to not perform a background scan operation.

3. The computer-implemented method of claim 1, wherein the electronic device is communicated with an access point (AP) via a channel, and the step of controlling the wireless communication module of the electronic device to not perform the at least one operation that will decrease throughput of comprises:
    if it is determined that the operating system of the electronic device enables the gaming mode, controlling the wireless communication module of the electronic device to not switch to other channels to determine if any other AP is capable of establishing a link, or to determine signal quality of the other channels.

4. The computer-implemented method of claim 1, wherein the step of controlling the wireless communication module of the electronic device to not perform the at least one operation that will decrease throughput comprises:
    if it is determined that the operating system of the electronic device enables the gaming mode, controlling the wireless communication module of the electronic device to not enter a low-power state.

5. The computer-implemented method of claim 1, wherein the step of determining if the operating system of the electronic device enables the gaming mode comprises:
    performing a service on the user mode to detect if the operating system of the electronic device enables the gaming mode.

6. The computer-implemented method of claim 5, wherein the service is performed by executing a dynamic link library (DLL) file.

7. A non-transitory computer program product having a plurality of files, wherein the plurality of files are executed by a computer to cause the computer to perform the steps of:
    determining if an operating system of the electronic device enables a gaming mode; and
    if the operating system is determined to enable the gaming mode, notifying a driver operating in a kernel mode that the gaming mode is enabled, and controlling a wireless communication module of the electronic device to not perform at least one operation that will decrease throughput; and
    if the operating system is determined not enable the gaming mode, the at least one operation that will decrease throughput is allowed to be executed by the wireless communication module;
    wherein the electronic device switches between a user mode and the kernel mode in which the user mode is used for applications and the kernel mode is used for core operating system components.

8. The non-transitory computer program product of claim 7, wherein the step of controlling the wireless communication module of the electronic device to not perform the at least one operation that will decrease throughput comprises:
    if it is determined that the operating system of the electronic device enables the gaming mode, controlling the wireless communication module of the electronic device to not perform a background scan operation.

9. The non-transitory computer program product of claim 7, wherein the electronic device is communicated with an access point (AP) via a channel, and the step of controlling the wireless communication module of the electronic device to not perform the at least one operation that will decrease throughput comprises:
    if it is determined that the operating system of the electronic device enables the gaming mode, controlling the wireless communication module of the electronic device to not switch to other channels to determine if any other AP is capable of establishing a link, or to determine signal quality of the other channels.

10. The non-transitory computer program product of claim 7, wherein the step of controlling the wireless communication module of the electronic device to not perform the at least one operation that will decrease throughput comprises:
    if it is determined that the operating system of the electronic device enables the gaming mode, controlling the wireless communication module of the electronic device to not enter a low-power state.

11. The non-transitory computer program product of claim 7, wherein the step of determining if the operating system of the electronic device enables the gaming mode comprises:
    performing a service on the user mode to detect if the operating system of the electronic device enables the gaming mode.

12. The non-transitory computer program product of claim 11, wherein the service is performed by executing a dynamic link library (DLL) file.

* * * * *